(12) United States Patent
Kim et al.

(10) Patent No.: US 9,237,552 B2
(45) Date of Patent: Jan. 12, 2016

(54) PAGING METHOD AND DEVICE FOR E-MBS TERMINAL IN MULTI-CARRIER SYSTEM

(75) Inventors: Jeongki Kim, Anyang-si (KR); Kiseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 13/643,869

(22) PCT Filed: Apr. 29, 2011

(86) PCT No.: PCT/KR2011/003227
§ 371 (c)(1),
(2), (4) Date: Oct. 26, 2012

(87) PCT Pub. No.: WO2011/136618
PCT Pub. Date: Nov. 3, 2011

(65) Prior Publication Data
US 2013/0058280 A1    Mar. 7, 2013

Related U.S. Application Data

(60) Provisional application No. 61/329,535, filed on Apr. 29, 2010, provisional application No. 61/357,099, filed on Jun. 22, 2010, provisional application No. 61/362,290, filed on Jul. 7, 2010.

(30) Foreign Application Priority Data

Apr. 29, 2011    (KR) ......................... 10-2011-0040519

(51) Int. Cl.
*H04W 8/06*    (2009.01)
*H04W 68/02*   (2009.01)
*H04W 4/06*    (2009.01)
*H04W 72/00*   (2009.01)

(52) U.S. Cl.
CPC .............. *H04W 68/025* (2013.01); *H04W 4/06* (2013.01); *H04W 72/005* (2013.01)

(58) Field of Classification Search
None
See application file for complete search history.

(56) References Cited

U.S. PATENT DOCUMENTS

| 2005/0282562 | A1 | 12/2005 | Lee et al. |
| 2007/0058544 | A1 | 3/2007 | Kim et al. |
| 2007/0233795 | A1 | 10/2007 | Setlow et al. |
| 2009/0046637 | A1* | 2/2009 | Kim et al. ..................... 370/329 |
| 2009/0156236 | A1 | 6/2009 | Jung et al. |
| 2009/0303953 | A1* | 12/2009 | Kang et al. .................... 370/329 |
| 2010/0240400 | A1* | 9/2010 | Choi ............................. 455/458 |
| 2011/0159905 | A1* | 6/2011 | Zheng ........................... 455/509 |

FOREIGN PATENT DOCUMENTS

| KR | 10-2006-0049401 A | 5/2006 |
| KR | 10-0754733 B1 | 9/2007 |
| KR | 10-2009-0065665 A | 6/2009 |

* cited by examiner

*Primary Examiner* — Faruk Hamza
*Assistant Examiner* — Alan Lindenbaum
(74) *Attorney, Agent, or Firm* — Birch, Stewart, Kolasch & Birch

(57) ABSTRACT

The present invention provides a method for receiving a paging message of an idle-mode terminal in a multi-carrier system, comprising the steps of: receiving, from a network, a paging message through a first carrier corresponding to a predetermined condition in a paging listening interval; transmitting, to the network, a first ranging request message that includes control information indicative of a location updating procedure for notifying a start of E-MBS service reception; determining, as a paging carrier, a second carrier from which an E-MBS service is transmitted; and receiving the paging message from the network through the determined second carrier.

6 Claims, 12 Drawing Sheets

(a)

(b)

(a)

(b)

PAGING METHOD AND DEVICE FOR E-MBS TERMINAL IN MULTI-CARRIER SYSTEM

CROSS REFERENCE TO RELATED APPLICATIONS

This application is the National Phase of PCT/KR2011/003227 filed on Apr. 29, 2011, which claims priority under 35 U.S.C. §119(e) to U.S. Provisional Application Nos. 61/329,535 filed on Apr. 29, 2010, 61/357,099 filed on Jun. 22, 2010, and 61/362,290 filed on Jul. 7, 2010, and under 35 U.S.C. §119(a) to Patent Application No. 10-2011-0040519 filed in the Republic of Korea on Apr. 29, 2011, all of which are hereby expressly incorporated by reference into the present application.

TECHNICAL FIELD

The present invention relates to a multi-carrier system, and more particularly, to a paging method and device for an enhanced multicast and broadcast service (E-MBS) terminal.

BACKGROUND ART

16m E-MBS (Enhanced Multicast and Broadcast Service)

An E-MBS provides an efficient method for simultaneous transmission of common downlink data to a group of users who use a common multicast STID (MSTID) and FID. The E-MBS service is only provided in downlink and coordination or synchronization is performed between base stations belonging to one group in order to allow macro diversity.

E-MBS is associated with a service flow provided along with quality of service (QOS) and traffic parameters for the service flow. Service flows for transmitting E-MSB data are accounted for to an individual terminal participating in the service while the terminal performs a general operation. During accounting, the terminal conforms the service and learns parameters associated with the service flow.

Each base station which may provide an E-MBS service belongs to a specific E-MBS zone and one base station may belong to a plurality of E-MBS zones. The E-MBS zone is defined as one set of base stations using the same MSTID and FID in order to transmit content of a specific service flow. Each E-MBS zone is identified by a unique E-MBS zone ID.

In order to guarantee an appropriate multicast operation over a network of a base station supporting an E-MBS, MSTIDs and FIDs used for a common E-MBS content and service should be the same to all base stations included in the same E-MBS zone.

This allows a terminal which has already registered with a specific service to seamlessly receive an E-MBS in an E-MBS zone, without reregistering with another base station included in the E-MBS zone and performing uplink communication.

Hereinafter, a carrier will be briefly described.

A user may perform a modulation operation with respect to the amplitude, frequency and/or phase of a sine wave and a periodic pulse wave. A sine wave or a pulse wave for carrying information is called a carrier.

Examples of a carrier modulation scheme include a Single-Carrier Modulation (SCM) scheme and a Multicarrier Modulation (MCM) scheme. Among others, the SCM scheme is to perform modulation with respect to all information carried on one carrier.

The MCM scheme refers to a technology of dividing an overall bandwidth channel of one carrier into several sub-channels each having a small bandwidth and transmitting a plurality of narrowband sub-carriers through the sub-channels.

At this time, when the MCM scheme is used, each of the sub-channels is approximated so as to have a flat channel due to the small bandwidth. A user can compensate for distortion of a channel using a simple equalizer. In addition, the MCM scheme is implemented at a high speed using Fast Fourier Transform (FFT) and is more advantageous in high-speed data transmission than the SCM scheme.

As capabilities of a base station and/or a terminal have been developed, a frequency bandwidth provided or used by the base station and/or the terminal has expanded. Accordingly, in the embodiments of the present invention, a multicarrier system supporting a wideband by aggregating one or more carriers is disclosed.

That is, in the following multi-carrier system, one or more carriers are aggregated and used, unlike the MCM scheme of dividing one carrier into sub-carriers and utilizing the sub-carriers.

In order to efficiently use multiband or multicarrier, a technique of managing several carriers (e.g., several frequency carriers (FCs)) by one medium access control (MAC) entity has been proposed.

FIGS. 1(a) and 1(b) are diagrams illustrating a method of transmitting or receiving a signal based on a multiband radio frequency (RF).

In FIG. 1, in a transmitter and a receiver, one MAC layer may manage several carriers in order to efficiently use multicarrier. In order to efficiently transmit or receive multicarrier, it is assumed that both the transmitter and the receiver can transmit or receive multicarrier. Since the frequency carriers (FCs) managed by one MAC layer do not need to be contiguous to each other, flexible resource management is possible. That is, both contiguous aggregation and non-contiguous aggregation are possible.

In FIGS. 1(a) and 1(b), a physical layer (PHY) 0, a physical layer 1, ..., a physical layer n–2 and a physical layer n–1 represent multiple bands of the present technique and each band may have an FC size assigned for a specific service according to a predetermined frequency policy. For example, the physical layer 0 (RF carrier 0) may have a frequency band size assigned for a general FM radio broadcast and the physical layer 1 (RF carrier 1) may have a frequency band size assigned for mobile telephone communication.

The frequency bands may have different frequency band sizes according to frequency band characteristics. However, in the following description, for convenience of description, it is assumed that each FC has a size of A [MHz]. Each frequency allocation band is representative of a carrier frequency for utilizing a baseband signal in each frequency band. Hereinafter, each frequency allocation band is referred to as "carrier frequency band" or simply "carrier" representative of each carrier frequency band if such use will not lead to confusion.

Recently, as in the 3GPP LTE-A, the above carrier may be referred to as "component carrier" in order to be distinguished from a subcarrier used in an MCM scheme.

Therefore, the above "multiband" scheme may be referred to as a "multicarrier" scheme or a "carrier aggregation" scheme.

FIGS. 2(a) and 2(b) show an example of using multicarrier in a general wireless communication system.

Multicarrier of a general technique may be a contiguous carrier aggregation as shown in FIG. 2(a) or a non-contiguous carrier aggregation as shown in FIG. 2(b). A unit for aggregating carriers is a basic bandwidth unit of a legacy system (e.g., LTE in case of a long term evolution (LTE)-advanced system or IEEE 802.16e in case of an IEEE 802.16m system) which is a general technique.

In the multicarrier environment of the general technique, the following two types of carriers are defined.

First, a first carrier (or a primary carrier) refers to a carrier for exchanging full physical (PHY)/MAC control information and traffic of a terminal and a base station. In addition, the primary carrier may be used for a general operation of a UE, such as network entry. Each terminal has one primary carrier in one cell.

A second carrier (or a secondary carrier) refers to a supplemental carrier which may be used to exchange traffic according to a rule and a BS-specific allocation command received from the first carrier. The second carrier may include control signaling in order to support a multicarrier operation.

In the general technique, the carrier of the multicarrier system may be divided into a fully configured carrier and a partially configured carrier based on the primary and secondary carriers.

The fully configured carrier refers to a carrier in which control signaling is set. In addition, parameters and information on multicarrier management and other carriers may be included in the control channels.

The partially configured carrier refers to a carrier in which all control channels supporting downlink transmission is set in a downlink carrier which is not paired with an uplink carrier in a time division duplex downlink transmission (TDD DL transmission) or frequency division duplex (FDD) mode.

In general, a terminal performs initial network entry through a primary carrier and may exchange information about mutual multicarrier capabilities in a registration process through exchange of a registration request/response (AAI_REG-REQ/RSP) message with a base station.

DISCLOSURE

Technical Problem

An object of the present invention is to solve a problem that a paging carrier transmitted by a paging message is not clear depending on whether an idle-mode terminal receives an E-MBS and to provide a method of appropriately setting a paging carrier depending on whether an E-MBS is received by enabling the idle-mode terminal to report E-MBS service reception start or end to a network.

Another object of the present invention is to provide a method of transmitting E-MBS service reception status information from a terminal to a base station when a terminal transitions to an idle mode.

Another object of the present invention is to provide a method of, at a base station, informing a terminal of a carrier for network reentry if the terminal cannot perform network reentry using a paging carrier.

Technical Solution

According to the present invention, a method of receiving a paging message of an idle-mode mobile station (MS) in a multicarrier system includes receiving the paging message from a network via a first carrier corresponding to a predetermined condition in a paging listening interval, transmitting, to the network, a first ranging request message including control information indicating a location update procedure for informing that reception of enhanced multicast and broadcast service (E-MBS) service starts, setting a second carrier for transmitting the E-MBS service as a paging carrier, and receiving the paging message from the network via the set second carrier.

The setting the second carrier as the paging carrier may further include receiving, from the network, paging carrier setting information indicating that the paging message is transmitted via the second carrier for transmitting the E-MBS service.

The paging carrier setting information may be received from the network via a ranging response (RNG-RSP) message.

The method may further include transmitting a second ranging request message including control information indicating a location update procedure for informing that reception of the E-MBS service ends, setting the first carrier as the paging carrier, and receiving the paging message from the network via the set first carrier.

The setting the first carrier as the paging carrier may further include receiving, from the network, a second ranging response message including paging carrier setting information indicating that the paging message is transmitted via the first carrier.

The predetermined condition may be a deregistration identifier (DID) used to identify the idle-mode MS modulo the number N of carriers in a paging group to which the network belongs.

The network may be a base station or a paging controller.

The first carrier may be a fully configured carrier and the second carrier may be a fully configured carrier or a partially configured carrier.

If the second carrier is a fully configured carrier, the first ranging request message may be transmitted via the first carrier and the second ranging request message may be transmitted via the second carrier.

If the second carrier is a partially configured carrier, the first and second ranging request messages may be transmitted via the first carrier.

The method may further include transmitting a deregistration request message including E-MBS service reception status information to a base station, and receiving a deregistration response message from the base station in response to the deregistration request message.

The E-MBS service reception status information may indicate start or end of reception of the E-MBS service.

The deregistration request message may further include paging carrier selection mode information indicating a request for transmitting the paging message via any one of the first carrier or the second carrier.

The deregistration response message may further include paging carrier selection mode information indicating that the paging message is transmitted via any one of the first carrier or the second carrier.

According to the present invention, a mobile station (MS) for receiving a paging message in a multicarrier system includes a radio frequency unit configured to transmit and receive a radio signal to and from an external device, and a controller connected to the radio frequency unit. The controller controls the radio frequency unit to receive a paging message from a network via a first carrier corresponding to a predetermined condition, controls the radio frequency unit to transmit, to the network, a first ranging request message including control information indicating a location update procedure for informing that reception of enhanced multicast and broadcast service (E-MBS) service starts, sets a second carrier for transmitting the E-MBS service as a paging carrier, and controls reception of a paging message from the network via the set second carrier.

The controller may control the radio frequency unit to transmit a second ranging request message including control information indicating a location update procedure for informing that reception of the E-MBS service ends, set the first carrier as a paging carrier, and control the radio frequency unit to receive the paging message from the network via the set first carrier.

The predetermined condition may be a deregistration identifier (DID) used to identify the idle-mode MS modulo the number N of carriers in a paging group to which the network belongs.

According to the present invention, a method of performing network reentry at an idle-mode mobile station in a multicarrier system includes receiving a paging message including carrier information indicating a carrier for network reentry from a base station via a paging carrier, and performing network reentry to the base station based on the carrier information. The paging carrier is a partially configured carrier.

The carrier information may be a physical carrier index.

The method may further include, if there is a plurality of carriers for network reentry, selecting any one of the carriers.

Any one of the carriers may be selected randomly or by performing a deregistration identifier (DID) used to identify the idle-mode MS modulo the number N of carriers in a paging group to which the network belongs.

The paging carrier may be a carrier for transmitting the E-MBS or a carrier corresponding to an identifier of the idle-mode MS modulo the number of carriers of a paging group.

Advantageous Effects

According to the present invention, by enabling an idle-mode terminal to inform a network (a base station or a paging controller) that reception of an E-MBS service starts or ends in a multicarrier system, it is possible to accurately set a paging carrier of the UE.

According to the present invention, by enabling a base station to inform a terminal of a carrier for network reentry, it is possible to reduce a cell reselection process unnecessarily performed by the UE.

BEST MODE

The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). IEEE 802.16m is an evolved version of IEEE 802.16e and provides backward compatibility with the IEEE 802.16e system.

The UTRA system is part of the Universal Mobile Telecommunications System (UMTS). A $3^{rd}$ Generation Partnership Project Long Term Evolution (3GPP LTE) communication system is part of the E-UMTS (Evolved UMTS) which employs the E-UTRA and employs OFDMA in downlink and employs SC-FDMA in uplink. The LTE-Advanced (LTE-A) is an evolved version of the 3GPP LTE.

For clarity of description, although IEEE 802.16m is focused upon, the technical spirit of the present invention is not limited thereto.

Figure 1:
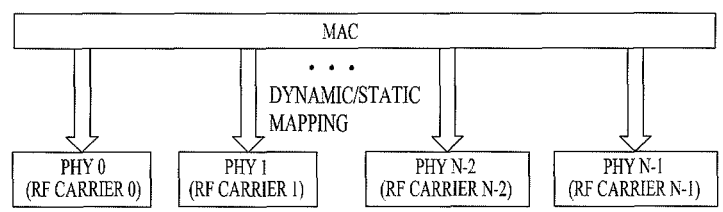
FIGS. 1(a) and 1(b) are diagrams illustrating a method of transmitting or receiving a signal based on a multiband radio frequency (RF).
Figure 1:
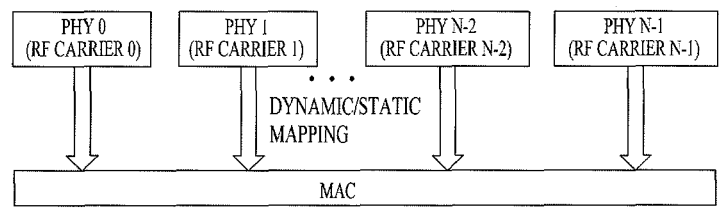
Figure 2:
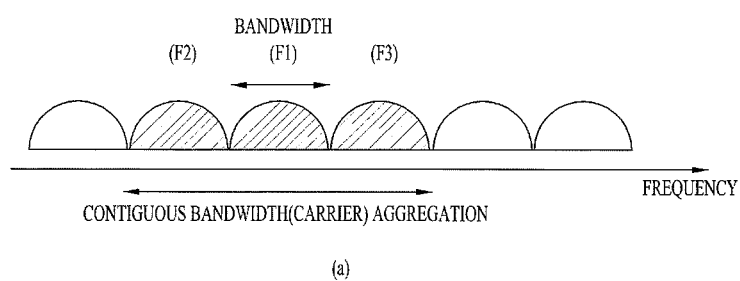
FIGS. 2(a) and 2(b) are diagrams showing an example of using multicarrier in a general wireless communication system.
Figure 2:
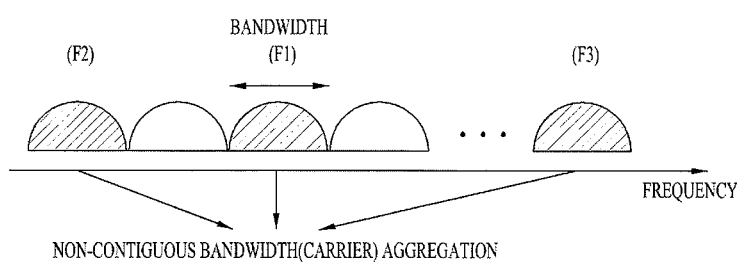
Figure 3:
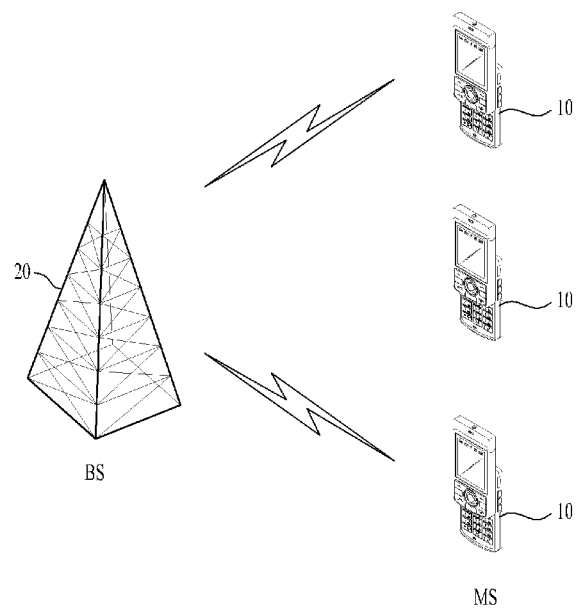
FIG. 3 is a block diagram showing a wireless communication system.

FIG. 3 is a block diagram showing a wireless communication system.

The wireless communication system provides various communication services such as voice and packet data.

Referring to FIG. 3, the wireless communication system includes a terminal (mobile station; MS) 10 and a base station (BS) 20. The MS 10 may be fixed or mobile and may also be called a user equipment (UE), a user terminal (UT), a subscriber station (SS), a wireless device, an advanced mobile station (AMS), etc.

The BS 20 is generally a fixed station communicating with the MS 10 and may also be called a node B, a base transceiver system (BTS), an access point, etc. One or more cells may exist in one BS 20.

The wireless communication system may be an orthogonal frequency division multiplexing (OFDM)/orthogonal frequency division multiple access (OFDMA) system.

OFDM uses a plurality of orthogonal subcarriers. OFDM uses orthogonality between inverse fast Fourier transform (IFFT) and fast Fourier transform (FFT). A transmitter performs IFFT with respect to data and transmits the transformed data. A receiver performs FFT with respect to a received signal and restores original data. The transmitter uses IFFT to aggregate multiple subcarriers and the receiver uses FFT to separate multiple subcarriers.

A slot is a minimum data allocation unit and is defined by a time and a subchannel. In uplink, a plurality of tiles constructs a subchanel. Six tiles construct a subchannel. In uplink, one burst include 3 OFDM symbols and one subchannel.

In partial usage of subchannels (PUSC) permutation, each tile may include 4 contiguous subcarriers on 3 OFDM symbols. Optionally, each tile may include 3 contiguous subcarriers on 3 OFDM symbols. A bin includes 9 contiguous subcarriers on an OFDM symbol. A band refers to a group of four rows of a bin and an adaptive modulation and coding (AMC) subchannel includes 6 contiguous bins in the same band.

Figure 4:
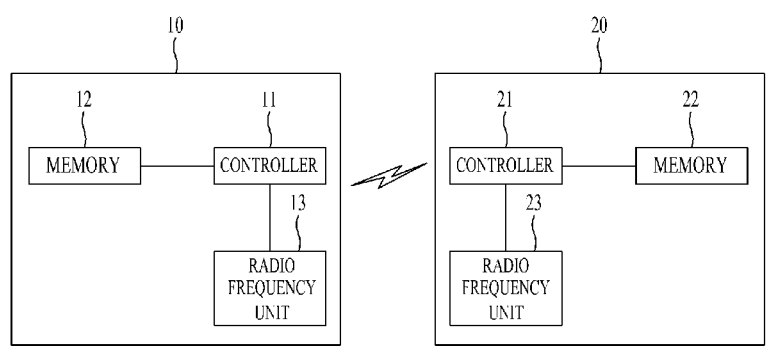
FIG. 4 is a block diagram showing internal configurations of a terminal and a base station in a radio access system.

FIG. 4 is a block diagram showing internal configurations of a terminal (MS) and a base station (BS) in a radio access system.

The MS 10 includes a controller 11, a memory 12 and a radio frequency (RF) unit 13.

The MS further includes a display unit, a user interface unit, etc.

The controller 11 performs a proposed function, process and/or method. Layers of a radio interface protocol may be implemented by the controller 11.

The memory 12 is connected to the controller 11 to store parameters or protocols for performing wireless communication. That is, the memory stores terminal driving systems, applications and general files.

The RF unit 13 is connected to the controller 11 to transmit and/or receive a radio signal.

In addition, the display unit displays a variety of information of the MS and includes a well-known elements such as a liquid crystal display (LCD) or an organic light emitting diode (OLED). The user interface unit may be a combination of well-known user interfaces such as a keypad or a touch screen.

The BS 20 includes a controller 21, a memory 22 and a radio frequency (RF) unit 23.

The controller 21 performs a proposed function, process and/or method. Layers of a radio interface protocol may be implemented by the controller 21.

The memory 22 is connected to the controller 21 to store parameters or protocols for performing wireless communication.

The RF unit 23 is connected to the controller 21 to transmit and/or receive a radio signal.

The controller 11 or 21 may include an application specific integrated circuit (ASIC), another chipset, a logic circuit and/or a data processor. The memory 12 or 22 may include a read only memory (ROM), a random access memory (RAM), a flash memory, a memory card, a storage medium and/or another storage device. The RF unit 13 or 23 may include a baseband circuit for processing a radio signal. When the embodiment is implemented by software, the above-described method may be implemented by a module (a process, a function, etc.) for performing the above-described function. The module is stored in the memory 12 or 22 and may be executed by the controller 11 or 21.

The memory 12 or 22 may be located inside or outside the controller 11 or 21 and may be connected to the controller 11 or 21 using a variety of well-known means.

Hereinafter, an E-MBS operation will be briefly described.

E-MBS Transmission Mode

A mode for transmitting E-MBS traffic includes a non-macro diversity transmission mode and a macro diversity transmission mode.

1. Non-Macro Diversity Mode

The non-macro diversity mode coordinates transmission of BSs located in the same zone in the same frame and is used when the macro diversity mode cannot be used. All BSs belonging to the same E-MBS zone transmit an SDU carrying the same content in the same frame. Such an SDU is mapped to MPDUs, which mean the same SDU fragments, the same fragment sequence number or the same fragment size, in the same frame. This enables AMSs to receive an E-MBS from the ABSs in the same zone.

2. Macro Diversity Mode

The macro diversity mode means synchronization of E-MBS transmission of all ABSs of one zone and means that all ABSs of one zone transmits the same data using the same resources at the same point of time. This causes the effect of obtaining macro diversity gain in E-MBS transmission. More specifically, All ABSs of the same zone share the following information.

1) E-MBS Zone ID, MSTID & FID, MSI, and Packet Classification Rule parameter(s)

2) Transmission PHY parameters, MCS associated with each E-MBS Burst including FEC Type, Modulation Type, and Repetition Coding 3) Mapping of SDUs to PDU (order of the SDUs and fragments) including Extended Headers)

4) Mapping of PDUs to bursts

5) Order of bursts in the zone/region

6) E-MBS MAP construction

E-MBs Protocol Features and Functions

1. E-MBs Configuration Indicator

E-MBS configuration information is periodically transmitted to MSs which interest in the E-MBS using an MAC message which is called an AAI_E-MBS-CFG message.

The E-MBS configuration indicator describes resources ensured for supplemental information necessary for an E-MBS operation and E-MBS traffic in downlink physical resources.

2. E-MBs Zone Configuration

Different E-MBS IDs and FIDs may be used in different E-MBS zones for the same E-MBS service flow. E-MBS_Zone_ID is used to represent a service region in which an E-MBS ID and FID for an E-MBS service flow is valid. In a BS supporting an E-MBS, an ID of an E-MBS zone to which the BS belongs is included in an E-MBS CFG message. The E-MBS zone ID may not become "0".

When the BS transmits an AAI DSA message in order to establish connection of the E-MBS zone ID, the E-MBS zone ID is encoded in the DSA message. One BS may have a plurality of E-MBS zone IDs for different E-MBS services.

3. E-MBs Scheduling Interval (MSI)

One MSI is present in each E-MBS zone. The MSI refers to the number of contiguous super frames for enabling an access network to schedule traffic for streams associated with the MBS zone before start of the MSI.

The MSI may have the length of the MSI denoted by $N_{MSI}$ and an interval of several super frames and depends on special use of the E-MBS. The MSI may have a length of $N_{MSI}$=4, 8, 16 and 32 super frames. An E-MBS map message has a mapping address of E-MBS data associated with an E-MBS zone during one MSI. The E-MBS map message is configured to be used to sufficiently define a transmission state of streams included in one MSI. Indication of the MSI length is transmitted via an SCD message. By using a super frame number, an $N_{Superframe}$ from an SFH and an $N_{MSI}$ from an SCD message, the MS calculates the start of the MSI as follows.

The MSI starts at a super frame in which $N_{Superframe}$ satisfies the following condition.

$N_{Superframe}$ Modulo $N_{MSI}$=0

The MS may demodulate E-MBS data bursts associated with content selected by a user. The MS awakes in each MSI in order to determine whether an E-MBS data burst to be demodulated is present.

Idle Mode

In a multicarrier system, a paging group information message (PGID_Info message) is transmitted in all fully configured carriers. A paging advertisement message (AAI_PAG-ADV message) for an MS is transmitted via one of the fully configured carriers. The idle-mode MS sets a carrier index for monitoring a paging message in a paging listening interval of the MS. A paging message transmitted in the paging listening interval is transmitted using the following rule.

Paging carrier index=DID modulo N

The value N is the number of carriers in a paging group of a BS used to transmit a paging message to the idle-mode MS. In addition, a deregistration identifier (DID) means an identifier for identifying the idle-mode MS.

A paging carrier index corresponds to an ascending order of physical carrier indexes of carriers used to transmit a paging message at a BS.

A paging carrier indication bit is used to specify whether the carrier is a paging carrier. If the paging carrier indication bit is "1", the carrier is a paging carrier. Paging carrier indications of other carriers may be included in a paging group information message or may be included in a neighboring advertisement message (AAI_NBR-ADV) or a multicarrier advertisement message (AAI_MC-ADV).

When the idle-mode MS moves to a new BS or when it is determined that an SFH change count of a new BS is equal to information received via a neighboring advertisement message, the MS may use a paging carrier indication received via a neighboring advertisement message if the paging carrier indication is included in the neighboring advertisement message.

The paging advertisement message is transmitted via one or more frames starting from a second subframe in a super frame.

A paging advertisement message may be transmitted to an E-MBS MS via the same carrier as an E-MBS-specific carrier.

As described above, when MSs which operate in a multi-carrier mode without receiving an E-MBS transition to an idle mode, a paging carrier for receiving a paging message from a network is set to a value obtained by DID modulo N and the MSs wait for the paging message to be received from the network via the carrier corresponding to a paging carrier index. That is, when the idle-mode MS wishes to receive an E-MBS, if the MS already has E-MBS configuration information, the MS receives the E-MBS using the previously received E-MBS configuration information.

However, if the MS receives the E-MBS using the previous E-MBS information in the idle mode without transmitting a signal to the BS, the BS performs paging with respect to the MS using a paging carrier before receiving the E-MBS and the MS determines that the paging message is transmitted using the E-MBS carrier.

Accordingly, there may be a method of transmitting paging information of all MSs subscribing to an E-MBS service via an E-MBS carrier at a network. In this case, since paging information of all MSs subscribing to the E-MBS should be transmitted via one E-MBS carrier in one paging group regardless of whether or not all MSs subscribing the E-MBS service actually receive the E-MBS service, this may increase paging overhead of the E-MBS carrier.

Hereinafter, embodiments of a method of appropriately setting a paging carrier of an MS by, at the MS, reporting an E-MBS service reception status (start or end) to a network in order to prevent paging overhead from unnecessarily concentrating in an E-MBS carrier proposed by the present specification will be described in detail.

First Embodiment

A first embodiment provides a paging message transmission method of a BS through reporting of an E-MBS service reception status (start or end) of an idle-mode MS.

That is, the first embodiment provides a method of setting a paging carrier of an MS such that a paging message is transmitted via a carrier ("first carrier") corresponding to DID modulo N instead of a carrier ("E-MBS carrier" or "second carrier") for transmitting an E-MBS service if an idle-mode MS subscribing to the E-MBS service does not receive the E-MBS service.

Figure 5:
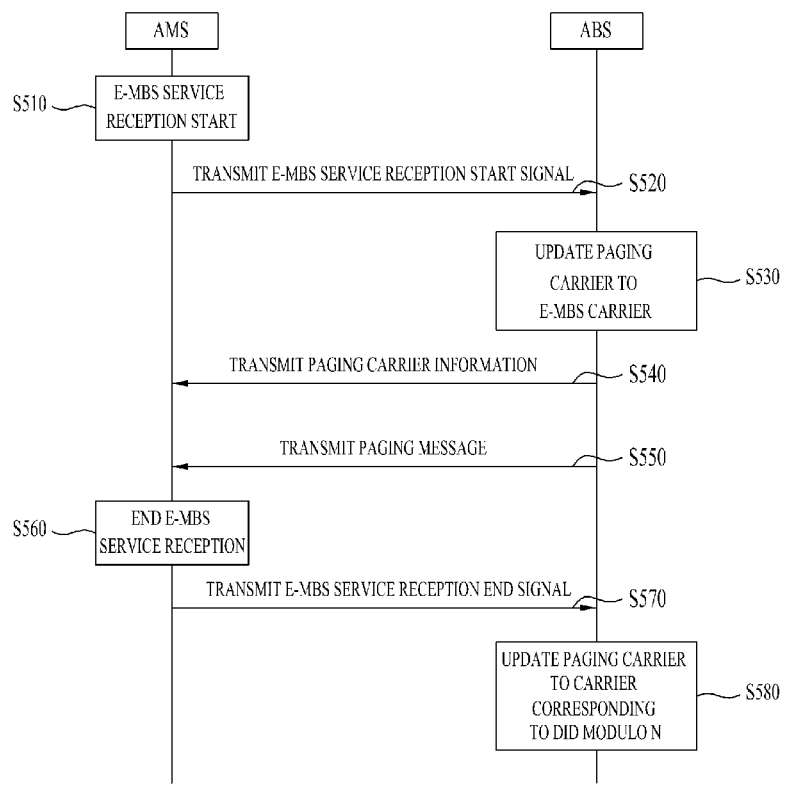
FIG. 5 is a flowchart illustrating a paging message reception method of a terminal according to reporting of an E-MBS service reception status (start or end) according to a first embodiment of the present invention.

FIG. 5 is a flowchart illustrating a paging message reception method of a terminal (AMS) through reporting of an E-MBS service reception status (start or end) according to a first embodiment of the present invention.

Referring to FIG. 5, an idle-mode AMS starts to receive an E-MBS service from an ABS (S510) and transmits, to a network, a signal indicating that reception of an E-MBS service starts (S520). Here, the network may be an ABS or a paging controller.

The signal indicating that reception of the E-MBS service starts may be transmitted via a location update procedure of the AMS. A method of informing that reception of the E-MBS service starts through the location update procedure will be described in detail below.

If the network receives the signal indicating that reception of the E-MBS service starts from the AMS, the network updates a paging carrier index of the idle-mode AMS to a carrier for providing the E-MBS service (S530).

Here, the network may transmit the updated paging carrier index, that is, the E-MBS carrier index, to the idle-mode AMS (S540). In this case, the idle-mode MS receives a paging message from the network via the E-MBS carrier (S550).

Thereafter, if the idle-mode MS which receives the E-MBS ends reception of the E-MBS (S560), the idle-mode MS transmits, to the network, a signal indicating that reception of the E-MBS service ends (S570).

If the network receives the signal indicating that reception of the E-MBS service ends from the idle-mode AMS, the network sets the paging carrier index of the AMS to a carrier index having a value obtained by the deregistration identifier (DID) of the idle-mode MS modulo N (the number of carriers in a paging group to which the ABS belongs (S580).

Figure 6:
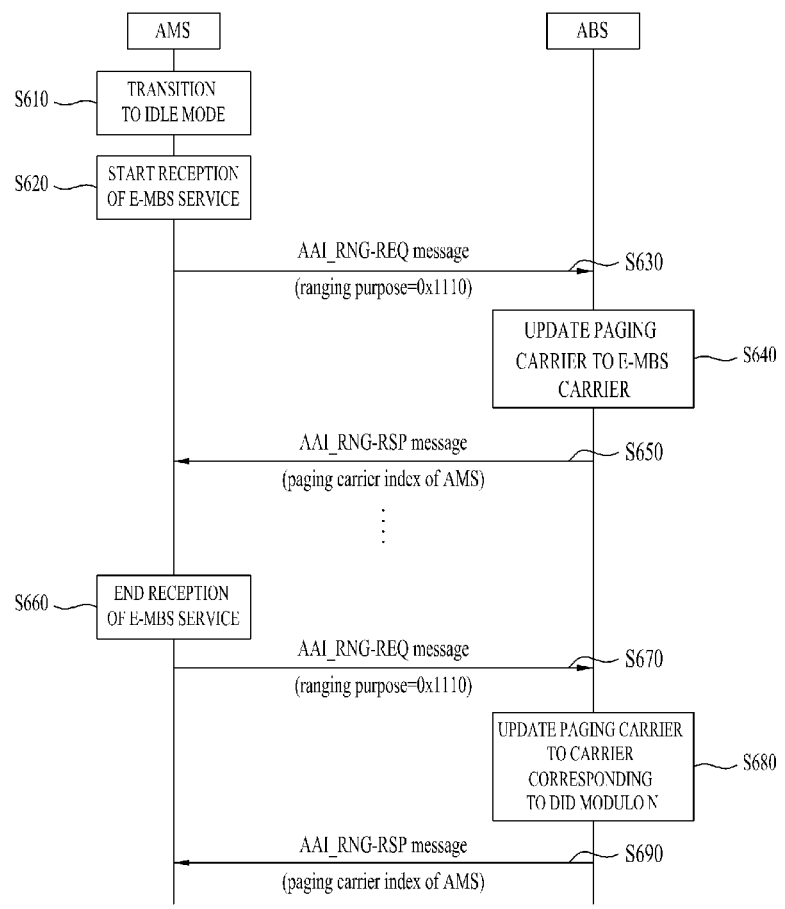
FIG. 6 is a flowchart illustrating a method of updating a paging carrier by performing a location update procedure for reporting the E-MBS service reception status according to the first embodiment of the present invention.

FIG. 6 is a flowchart illustrating a method of updating a paging carrier by performing a location update procedure for reporting the E-MBS service reception status according to the first embodiment of the present invention.

Referring to FIG. 6, if the idle-mode MS receives the E-MBS (S610 and S620), a ranging request message including control information indicating the location update procedure of informing that reception of the E-MBS service starts is transmitted to the ABS (S630).

Here, the control information is a ranging purpose indication indicating a ranging purpose.

For example, if reception of the E-MBS service is started, the ranging purpose indication may be set to "0x1110".

That is, if the network receives the ranging request message in which the ranging purpose indication is set to "0x1110" from the idle-mode AMS, the paging carrier of the MS is set to the E-MBS carrier (S640). Here, the E-MBS carrier may be a dedicated carrier for transmitting the E-MBS.

Here, the network (the ABS or the paging controller) may include the set paging carrier index in a ranging response message and inform the AMS of the paging carrier (S650), when responding to the location update of the AMS.

If the paging carrier index is not included in the ranging response message AAI_RNG-RSP transmitted to the idle-mode AMS, the AMS automatically sets the E-MBS carrier as the paging carrier.

Thereafter, if the idle-mode AMS ends reception of the E-MBS service (S660), the idle-mode AMS transmits a ranging request message including control information indicating the location update procedure indicating that reception of the E-MBS service ends to the network (the ABS or the paging controller) (S670).

Here, the control information is ranging purpose indication information and the ranging purpose indication may be set to "0x1111" for example in case of location update for informing that reception of the E-MBS ends.

That is, if the ABS receives a location update signal (e.g., ranging purpose indication="0x1111") indicating that reception of the E-MBS service ends from the idle-mode AMS, the ABS sets the paging carrier of the idle-mode AMS to a value obtained by DID of the idle-mode AMS modulo N (the number of carriers of a paging group to which the ABS belongs) (S680).

Here, the ABS may inform the idle-mode AMS of the paging carrier index corresponding to DID modulo N in a ranging response message (AAI_RNG-RSP message) when responding to location update of the AMS (S690).

When the AMS receives the E-MBS service, in order to inform the network that reception of the E-MBS service starts, a ranging purpose indication value (e.g., "0x0110") previously defined for service flow management encoding update may be used.

Figure 7A:
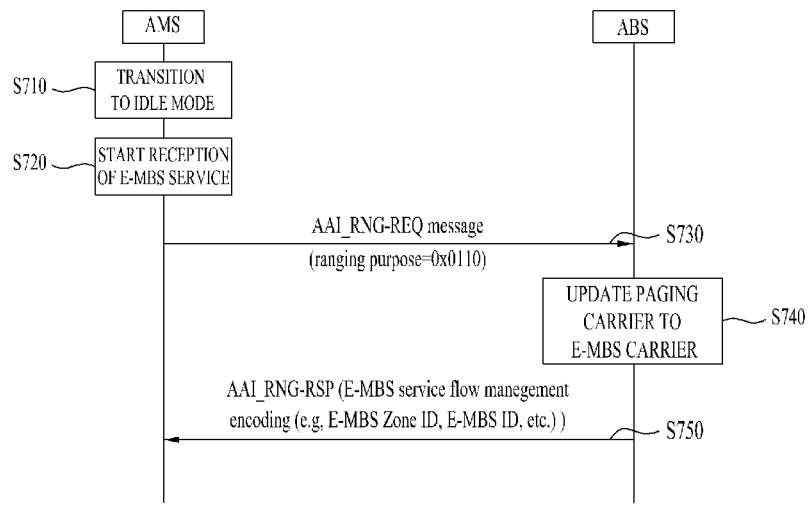
FIGS. 7(a) and 7(B) are flowcharts illustrating a method of updating a paging carrier by performing a location update procedure for reporting the E-MBS service reception status as another example of the first embodiment of the present invention.
Figure 7B:
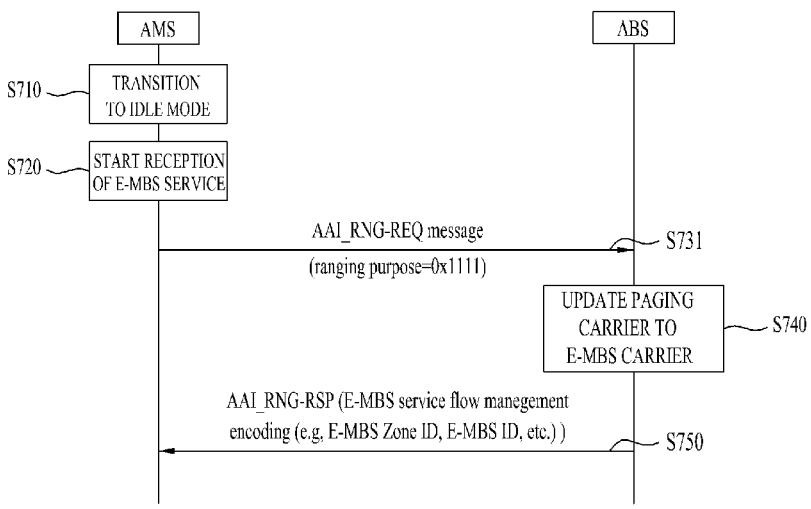

FIGS. 7(a) and 7(b) are flowcharts illustrating a method of updating a paging carrier by performing a location update procedure for reporting the E-MBS service reception status as another example of the first embodiment of the present invention.

Referring to FIG. 7(a), if the idle-mode AMS wishes to start to receive the E-MBS service and does not have E-MBS service flow management encoding information (e.g., E-MBS zone ID, E-MBS IDs and FIDs, physical carrier index, . . . ) of an E-MBS zone which currently provides a service, the AMS transmits a ranging request message in which ranging purpose indication is set to, for example, "0b0110" to the ABS in order to acquire the E-MBS service flow management encoding information from the ABS (S710 to S730).

The ABS transmits a ranging response message (AAI_RNG-RSP) message including the E-MBS service flow management encoding information to the AMS in response to the ranging request message (S750).

Here, the ABS sets the paging carrier to an E-MBS carrier (S740). In addition, the set paging carrier may be transmitted to the idle-mode AMS in a state of being included in the ranging response message.

FIG. 7(b) shows the case in which the ranging purpose indication is "0x1111" in step S730.

Table 1 shows an example of the format of a ranging request message (RNG-REQ message) according to the first embodiment of the present invention.

TABLE 1

| M/O | Attributes/ Array of attributes | Size (bits) | Value/Note | Conditions |
|---|---|---|---|---|
| O | Ranging purpose Indication | 8 | 0b0000 = Initial network entry. . . . 0b1110 = Location update process to notify the Paging controller/ABS of the start of receiving E-MBS service. In this case the paging carrier is updated to the carrier which provides E-MBS. 0b1111 = Location update process to notify the Paging controller/ABS of the end of receiving E-MBS service. In this case the paging carrier of this AMS is updated to the paging carrier index calculated by the following equation. Paging carrier index = DID modulo N | |

Referring to Table 1, the ranging purpose indication field value set to "0b1110" indicates a location update procedure for informing that reception of the E-MBS service starts and the ranging purpose indication field value set to "0b1110" indicates a location update procedure for informing that reception of the E-MBS service ends.

Table 2 shows another example of the format of a ranging request message (RNG-REQ message) according to the first embodiment of the present invention.

TABLE 2

| M/O | Attributes/ Array of attributes | Size (bits) | Value/Note | Conditions |
|---|---|---|---|---|
| O | Ranging purpose Indication | 8 | 0b0000 = Initial network entry. . . . 0b0110 = Either location update for updating service flow management encordings for E-MBS flows or location update to notify the Paging controller/ABS of the start of receiving E-MBS service. In case of the latter the paging carrier is updated to the carrier for E-MBS. 0b1111 (or 0b1110) = Location update process to notify the Paging controller/ABS of the end of receiving E-MBS service. In this case the paging carrier of this AMS is updated to the paging carrier index calculated by the following equation. Paging carrier index = DID modulo N | |

Referring to Table 2, the ranging purpose indication field value set to "0b0110" indicates a location update procedure for informing that reception of the E-MBS service starts and the ranging purpose indication field value set to "0b1111" indicates a location update procedure for informing that reception of the E-MBS service ends.

Table 3 shows another example of the format of a ranging response message (RNG-RSP message) according to the first embodiment of the present invention.

TABLE 3

| M/O | Attributes/ Array of attributes | Size (bits) | Value/Note | Conditions |
|---|---|---|---|---|
| O | Ranging response | 8 | 0x00 = Success of Location Update 0x01 = Failure of Location Update0x02 = Reserved 0x03 = Success of location update and DL traffic pending0x04 = Allow AMS's DCR mode initiation request or DCR mode extension request 0x05 = Reject AMS's DCR mode initiation request or DCR mode extension request 0x06~0xF: Reserved | |
| | Paging carrier index | 8 | Indicates the physical carrier index where the AAI PAG-ADV for the AMS is transmitted. | |

Referring to Table 3, the range response message includes a paging carrier index field indicating a physical carrier index where a paging advertisement message for the idle-mode AMS is transmitted.

According to another embodiment of the present invention, the idle-mode AMS may transmit, to the ABS, a ranging request message (AAI-RNG-REQ message) indicating that any one ranging purpose indication indicates a location update procedure for requesting a paging carrier.

The ABS receives the ranging request message including the ranging purpose indication for requesting the paging carrier from the idle-mode AMS and transmits a ranging response message including a paging carrier index to the idle-mode AMS.

Table 4 shows an example of the format of a ranging request message including a ranging purpose indication indicating a location update procedure for requesting a paging carrier according to an embodiment of the present invention.

TABLE 4

| Attributes/ Array of attributes | Size (bits) | Value/Note | Conditions |
|---|---|---|---|
| Ranging purpose Indication | 8 | 0b0000 = Initial network entry.... 0b1111 (or 0b1110) = Location update process for requesting the change of paging carrier | |
| If (Ranging purpose Indication == 0b1111) { | | | |
| Preferred Paging carrier type | 1 | 0: The carrier where the E-MBS service is provided. It implicitly indicates the start of receiving E-MBS service 1: The carrier with the carrier index = DID modulo N It implicitly indicates the end of receiving E-MBS service | |
| } | | | |

Referring to Table 4, a preferred paging carrier type field indicates whether the paging carrier requested by the AMS from the ABS is an E-MBS carrier or a carrier corresponding to DID modulo N.

For example, if the preferred paging carrier type field value is "0", an E-MBS carrier is requested as a paging carrier, which indicates that the idle-mode AMS starts to receive the E-MBS service.

In addition, if the preferred paging carrier type field value is "1", a carrier corresponding to DID modulo N is requested as a paging carrier, which indicates that the idle-mode AMS ends reception of the E-MBS service.

Table 5 shows another example of the format of a ranging request message including a ranging purpose indication indicating a location update procedure for requesting a paging carrier according to an embodiment of the present invention.

TABLE 5

| Attributes/ Array of attributes | Size (bits) | Value/Note | Conditions |
|---|---|---|---|
| Ranging purpose Indication | 8 | 0b0000 = Initial network entry.... 0b1111 (or 0b1110) = Location update process for reporting the status of E-MBS data reception | |
| If (Ranging purpose Indication == 0b1111) { | | | |
| E-MBSstatus | 1 | 0: The start of receiving E-MBS service. The paging carrier shall be set to the carrier which E-MBS data is sent. 1: The end of receiving E-MBS service. The paging carrier is the carrier with the carrier index = DID modulo N. | |
| } | | | |

Referring to Table 5, an E-MBS status field value of "0" indicates that the AMS starts to receive the E-MBS service and a paging carrier is set to an E-MBS carrier.

An E-MBS status field value of "1" indicates that the AMS ends reception of the E-MBS service and a paging carrier is set to a carrier corresponding to DID modulo N.

In Table 5, the E-MBS status field value is included if the ranging purpose indication is set to 0b1111. However, the E-MBS status information field indicating start or end of the E-MBS service may be included in the AAI-RNG-REQ message to inform the ABS of associated information, even when the ranging purpose indication is set to a value other than 0b1111. For example, when the ranging purpose indication indicates normal location update (0b0011), an E-MBS status field may be included in an AAI-RNG-REQ message to be sent to the ABS as an optional field.

Hereinafter, a method of transmitting a paging message from a network (an ABS or a paging controller) to an idle-mode AMS and, at an AMS, selecting a paging carrier according to circumstances according to another embodiment of the present invention will be briefly described.

The network (the ABS or the paging controller) transmits not only a paging message (AAI_PAG-ADV) of idle-mode AMSs which receive an E-MBS service but also a paging message of AMSs which do not receive the E-MBS service in a carrier ("E-MBS carrier") in which an E-MBS is transmitted. Here, the AMSs which do not receive the E-MBS service refer to idle-mode AMSs in which a paging carrier corresponding to a paging carrier index obtained by DID of the AMS modulo N is set.

That is, the paging message for all idle-mode AMS belonging to all paging groups belonging to the ABS is transmitted via the E-MBS carrier and the paging message for the idle-mode AMS is transmitted via the paging carrier set by DID modulo N.

If the idle-mode AMS receives the E-MBS service, the AMS selects an E-MBS carrier as a paging carrier and receives a paging message from the network via the E-MBS carrier.

Thereafter, if the idle-mode AMS which received the E-MBS service ends reception of the E-MBS service, the AMS sets a paging carrier to a carrier set by DID modulo N in the E-MBS carrier. The paging message is received from the network via the carrier corresponding to DID modulo N.

As another embodiment of the present invention, as another method of transmitting a paging message to an idle-mode AMS which receives an E-MBS service using an E-MBS dedicated carrier, an ABS transmits a paging advertisement (AAI_PAG-ADV) message to AMSs which receive the E-MBS service via all carriers corresponding to a paging carrier index obtained by DID modulo N and an E-MBs carrier.

Hereinafter, a method of receiving a paging message from a network through reporting of an E-MBS service reception status (start or end) when the AMS transitions from a connected mode to an idle mode will be described in detail.

Second Embodiment

A second embodiment provides a method of receiving a paging message from a network through reporting of an E-MBS service reception status of an AMS when the AMS transitions from a connected state to an idle mode.

That is, in the second embodiment, an AMS may inform an ABS of information indicating whether the AMS currently receives an E-MBS service in a deregistration process.

When the ABS transitions to the idle mode, if the AMS currently receives an E-MBS service, the ABS and the AMS set a paging carrier to an E-MBS carrier and, if the AMS does not receive the E-MBS service, the ABS and the AMS sets to a paging carrier to a carrier corresponding to DID module N.

Figure 8:
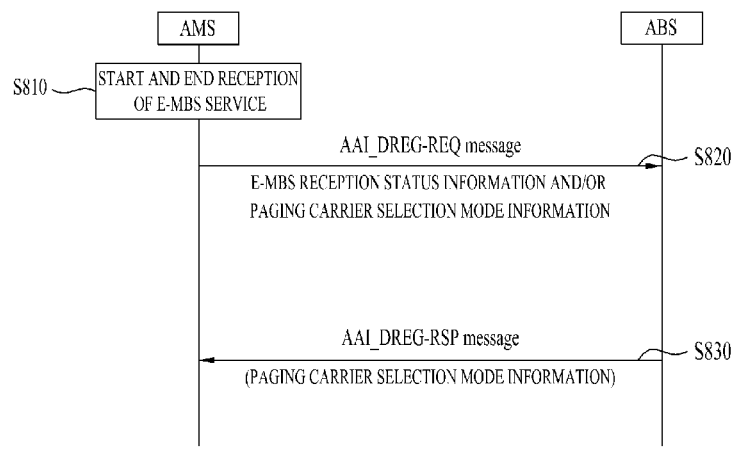
FIG. 8 is a flowchart illustrating a method of transmitting E-MBS service reception status information to a base station in a process of deregistering a terminal with the base station.

FIG. 8 is a flowchart illustrating a method of transmitting E-MBS service reception status information to an ABS in a process of deregistering an AMS with the base station.

Referring to FIG. 8, the AMS may receive or may not receive an E-MBS service (S810).

The AMS transmits a deregistration request (DREG-REQ) message including E-MBS service reception status information to the ABS when transitioning to the idle mode (S820). Here, the E-MBS service reception status information refers to information indicating whether the AMS currently receives the E-MBS service, that is, that reception of the E-MBS service starts or ends, of which the ABS is informed.

Table 6 shows an example of the format of a deregistration request (AAI_DREG-REQ) message including E-MBS service reception status information according to the second embodiment of the present invention.

TABLE 6

| M/O | Attributes/Array of attributes | Size (bits) | Value/Notes | Conditions |
|---|---|---|---|---|
| M | E-MBS reception status | | Indicates whether the AMS currently receives the E-MBS 0b0: AMS does not receive E-MBS 0b1: AMS receives E-MBS | |

The deregistration request message may further include information about a paging carrier selection mode indicating a paging carrier which desires to be used by the AMS from the viewpoint of the ABS in order to select a paging carrier when the AMS enters the idle mode.

Table 7 shows an example of the format of the registration request message (AAI_DREG-REQ message) including paging carrier selection mode information according to an embodiment of the present invention.

TABLE 7

| M/O | Attributes/Array of atteributes | Size (bits) | Value/Notes |
|---|---|---|---|
| M | Paging carrier selection mode | 1 | Indicates whether the paging carrier index for the AMS which currently receives the E-MBS service is configured based on the equation "DID modulo N" or to the carrier where the E-MBS service is provided. 0b0: The paging carrier index is set to the equation "DID modulo N". 0b1: The paging carrier index for AMS is set to the carrier where the E-MBS service is provided. |

Referring to Table 7, if the AMS transitions to the idle mode when receiving the E-MBS service, the AMS transmits, to the ABS, information indicating in which paging carrier mode the service is received.

For example, a paging carrier selection mode value set to "0b0" indicates that the AMS wishes to receive a paging message with a paging carrier index corresponding to DID modulo N when receiving the E-MBS service.

A paging carrier selection mode value set to "0b1" indicates that the AMS wishes to receive a paging message with an E-MBS carrier when receiving the E-MBS service.

Next, the ABS transmits a deregistration response (AAI_DREG-RSP) message to the AMS in response to the deregistration request message (S830), if the deregistration request message including E-MBS service reception status information and paging carrier selection mode information is received from the AMS.

Here, the deregistration response message includes paging carrier selection mode information. The paging carrier selection mode information indicates information indicating a paging carrier selection mode which will be used by the AMS in consideration of the value of the paging carrier selection mode field when the ABS receives AAI_DREG-REQ from the AMS.

Table 8 shows an example of the format of the registration request message (AAI_DREG-REQ message) including paging carrier selection mode information according to an embodiment of the present invention.

TABLE 8

| M/O | Attributes/Array of attributes | Size (bits) | Value/Notes |
|---|---|---|---|
| M | Paging carrier selection mode | 1 | Indicates whether the paging carrier index for AMS is the index based on the equation "DID modulo N" or the carrier where the E-MBS service is provided. 0b0: The paging carrier index is set to the equation "DID modulo N". 0b1: The paging carrier index for AMS is set to the carrier where the E-MBS service is provided. |

Referring to Table 8, if the ABS transmits the deregistration response (AAI_DREG-RSP) message including a pacing carrier selection mode set to "0b0" to the AMS, the AMS determines that the paging carrier index is set to DID modulo N when receiving the E-MBS service and may not report information indicating that reception of the E-MBS reception starts or ends to the ABS in the idle mode.

In addition, the AMS may include both the above-described E-MBS service reception status information and the paging carrier selection mode information upon receiving the E-MBS in the deregistration request message and transmit the deregistration request message to the ABS.

Table 9 shows an example of the format of the registration request message including E-MBS service reception status (start or end) information and paging carrier selection mode information according to an embodiment of the present invention.

TABLE 9

| M/O | Attributes/ Array of attributes | Size (bits) | Value/Notes | Conditions |
|---|---|---|---|---|
| M | Paging carrier selection mode | 1 | Indicates whether the paging carrier index for the AMS which currently receives the E-MBS service is configured based on the equation "DID modulo N" or to the carrier where the E-MBS service is provided. 0b0: The paging carrier index is set to the equation "DID modulo N". 0b1: The paging carrier index for AMS is set to the carrier where the E-MBS service is provided. | |
| M | E-MBS reception status | 1 | Indicates whether the AMS currently receives the E-MBS 0b0: AMS does not receive E-MBS 0b1: AMS receives E-MBS | It will be present when Paging carrier selection mode is 0b1 |

Referring to Table 9, only when a paging carrier index for an E-MBS AMS is an E-MBS carrier, the AMS reports an E-MBS service reception status. If the ABS sets a paging carrier index to an E-MBS carrier, the AMS informs the ABS that reception of the E-MBS service reception starts or ends.

As described in the first embodiment, the AMS may inform the ABS that reception of the E-MBS service reception starts or ends through the location update procedure.

Table 10 shows an example of the format of a registration request message including paging carrier selection mode information implicitly indicating E-MBS service reception status information according to an embodiment of the present invention.

TABLE 10

| M/O | Attributes/ Array of attributes | Size (bits) | Value/Notes |
|---|---|---|---|
| M | Paging carrier selection mode | 1 | Indicates whether the paging carrier index for the AMS which currently receives the E-MBS service is configured based on the equation "DID modulo N" or to the carrier where the E-MBS service is provided. 0b0: The paging carrier index is set to the equation "DID modulo N". This value shall be generally chosen by when the AMS does not receive E-MBS service currently. 0b1: The paging carrier index for AMS is set to the carrier where the E-MBS service is provided. This value shall be generally chosen by AMS when the ABS receives E-MBS service currently. This implicitly indicates that the AMS receives E-MBS service currently. |

Referring to Table 10, the paging carrier selection mode filed implicitly indicates the E-MBS reception status information. For example, a paging carrier selection mode field value of "0b0" indicates that the AMS enters the idle mode in a state in which the AMS does not currently receive the E-MBS service and a paging carrier selection mode field value of "0b1" indicates that the AMS currently receives the E-MBS service.

Hereinafter, a method of performing network reentry to an ABS when an idle-mode AMS receives a paging message from a network via a paging carrier according to a third embodiment of the present invention will be described in detail.

Third Embodiment

The third embodiment provides a method of, at an AMS, performing network reentry to an ABS if a network reentry process cannot be performed via a paging carrier (for example, if a partially configured carrier or a cell bar of a paging carrier is set to "1").

First, when transmitting a paging message to E-MBS AMSs (that is, AMSs which do not perform dynamic service deletion (DSD) after performing dynamic service addition (DSA)), the ABS transmits a paging message using an E-MBS carrier and then transmits a paging message of the AMS with a value set by DID modulo N if the AMS does not perform network reentry in a predetermined time (paging cycle).

After the paging carrier of the AMS is set to DID modulo N, if the AMS does not perform network reentry in a predetermined time after a paging message waking the AMS up is sent via the carrier, the ABS transmits a paging message via an E-MBS carrier.

If the idle-mode AMS receives a paging message waking the idle-mode AMS up via a paging carrier and cannot perform network reentry using the paging carrier (e.g., a carrier in which cell bar=1 or paging is transmitted is a partially configured carrier, the AMS should perform a network entry process using a carrier other than the paging carrier.

Hereinafter, methods (Methods 1 to 5) of, at an ABS, informing an AMS of a network entry carrier in order to enable the AMS to rapidly perform network entry will be described.

1. Method 1

Method 1 is a cell reselection process.

If a carrier in which the AMS receives a paging message from the ABS is a partially configured carrier, the AMS performs a cell reselection process. That is, the AMS sets a network reentry carrier through the cell reselection process and then performs a network reentry process through the set carrier.

2. Method 2

Method 2 is a process of performing network reentry using a carrier corresponding to DID modulo N.

If the AMS cannot perform network entry using a paging carrier transmitted by a paging message, the AMS performs a network reentry procedure using a carrier corresponding to DID modulo N.

If the AMS cannot perform network entry using the paging carrier, the paging carrier may be a partially configured carrier or cell bar=1.

For example, when the AMS subscribes to an E-MBS service and receives the paging message from the network using an E-MBS dedicated carrier which is a partially configured carrier, the AMS sets a carrier corresponding to DID modulo N (number of carriers per PGID in an ABS) as a network reentry carrier.

The AMS paged via the E-MBS carrier performs network reentry using a carrier corresponding to DID modulo N.

The AMS which receives the E-MBS via a partially configured carrier receives the value N via paging group information (PGID), a multicarrier advertisement (MC-ADV) message and a neighboring advertisement (NBR-ADV) message when the AMS enters the idle mode (through the deregistration process). Accordingly, the AMS may calculate a network reentry carrier via DID modulo N.

Method 3

Method 3 is a method of transmitting carrier information for transmitting carrier information for network entry from an ABS to an AMS.

The ABS includes physical carrier index information for enabling the AMS to perform network entry in a paging message and transmits the paging information to the AMS in order to instruct the paged AMS to perform network entry using another carrier. At this time, the paging carrier index information included in the paging message may be equally or differently applied to all AMSs included in the paging message.

Table 11 shows an example of the format of a paging advertisement message (PAG-ADV message) according to an embodiment of the present invention.

TABLE 11

| Field | Size | Description | Condition |
| --- | --- | --- | --- |
| Paging_Group_IDs bitmap | L | | L equals the Num_PGIDs in PGIDInfomessage |
| For (i=0; i<M; i++) { | | | M equals the number of bits in Paging_Group_IDs bitmap whose bit is set to 1. |
| For (j=0; j<Num_AMSs;j++) { | | Num_AMSs indicates the number of paged AMSs in a corresponding paginggroup1 . . . 32 | |
| Deregistration Identifier | 18 | Used to indicate Deregistration ID for the AMS to be paged (Deregistration Identifier and Paging Cycle are used to identify each paged AMS)0 . . . 218-1 | |
| MAC Address Hash | 24 | Used to identify the AMS to be paged | |
| Paging Cycle | | | |
| Action code | | | |
| Physical carrier index | 6 | Indicates a carrier index for enabling the AMS to perform network reentry. The AMS performs network reentry using a carrier indicated by the carrier index. | Includes a physical carrier index when the ABS supports multiple carriers, a paging message is transmitted via a partially configured carrier or when a cell bar of a carrier in which the paging carrier is transmitted is set to 1. |
| } } | | | |

The ABS may include one or more pieces of carrier index information for network entry in a paging message and transmit the paging message to the AMS.

That is, all carrier information for network reentry of multicarrier information supported by the ABS is included and transmitted to the AMS.

Table 12 shows an example of the format of a paging advertisement message including all carrier information for network reentry.

TABLE 12

| Field | Size | Description | Condition |
|---|---|---|---|
| Paging_Group_IDs bitmap | L | | L equals the Num_PGIDs in PGIDInfomessage M equals the number of bits in Paging_Group_IDs bitmap whose bit is set to 1. |
| For (i=0; i<M; i++) { | | | |
| For (j=0; j<Num_AMSs;j++) { | | Num_AMSs indicates the number of paged AMSs in a corresponding paginggroup1 ... 32 | |
| Deregistration Identifier | 18 | Used to indicate Used to indicate Deregistration ID for the AMS to be paged (Deregistration Identifier and Paging Cycle are used to identify each paged AMS)0 ... 2$^{18}$-1 | |
| MAC Address Hash | 24 | Used to identify the AMS to be paged | |
| Paging Cycle | | | |
| Action code | | | |
| } | | | |
| } | | | |
| For (j=0; j<Num_CarrierIndexes; j++) { | | Num_CarrierIndexes indicates the number of carriers for network reentry. | |
| Physical carrier index | 6 | Indicates a carrier index for enabling all AMSs which receive this paging message to perform network reentry. The AMS performs network reentry using a carrier indicated by the carrier index. | Includes a physical carrier index when the ABS supports multiple carriers, a paging message is transmitted via a partially configured carrier or when a cell bar of a carrier in which the paging carrier is transmitted is set to 1. |
| } | | | |

The AMS which receives the paging message including one or more physical carrier indices from the ABS selects a carrier for network reentry from among the received physical carrier indices and performs network reentry using the selected carrier.

If the number of selected carriers (for network reentry) is one, network reentry is performed using the carrier.

If the number of selected carriers (for network reentry) is two or more, the AMS selects one carrier for network reentry using any one of the following methods and performs network reentry with the ABS via the selected carrier.

(1) The AMS randomly selects one of carriers for network reentry and performs network reentry with the ABS.

(2) When the number of carriers for network reentry is M, the AMS performs network reentry using a carrier of an index corresponding to a value obtained by DID modulo M.

Physical carrier index information for network reentry, which is transmitted by the ABS, may be differently applied to AMSs. In this case, an example of the format of a paging advertisement (PAG-ADV) message may be configured as shown in Table 13.

TABLE 13

| Field | Size | Description | Condition |
|---|---|---|---|
| Paging_Group_IDs bitmap | L | | L equals the Num_PGIDs in PGIDInfomessage M equals the number of bits in Paging_Group_IDs bitmap whose bit is set to 1. |
| For (i=0; i<M; i++) { | | | |

TABLE 13-continued

| Field | Size | Description | Condition |
|---|---|---|---|
| For (j=0; j<Num_AMSs;j++) { | | Num_AMSs indicates the number of paged AMSs in a corresponding paginggroup1 . . . 32 | |
| Deregistration Identifier | 18 | Used to indicate Deregistration ID for the AMS to be paged (DeregistrationIdentifier and Paging Cycle are used to identify each paged AMS)0 . . . 218-1 | |
| MAC Address Hash | 24 | Used to identify the AMS to be paged | |
| Paging Cycle Action code | | | |
| Physical carrier index | 6 | Indicates a carrier index for enabling the AMS to perform network reentry. The AMS performs network reentry using a carrier indicated by the carrier index. | Includes a physical carrier index when the ABS supports multiple carriers, a paging message is transmitted via a partially configured carrier or when a cell bar of a carrier in which the paging carrier is transmitted is set to 1. |
| } } | | | |

Referring to Table 13, it is possible to reduce overhead of a specific carrier by informing each AMS of a carrier index for network reentry.

4. Method 4

When the ABS transmits a paging message to the AMS via a paging carrier and when network entry via the paging carrier is inhibited, the ABS includes cell bar information in a paging message and transmits the paging message to the AMS.

For example, if the cell bar is set to "1", this indicates that network reentry cannot be performed via the carrier and the AMS performs network reentry using the carrier corresponding to DID modulo N.

Table 14 shows an example of the format of a paging advertisement (AAI_PAG-ADV) message including cell bar information.

TABLE 14

| Syntax | Size | Description |
|---|---|---|
| AAI_PAG-ADV message ( ) { | | |
| Cell bar | 1 | Indicates whether AAI_PAG-ADV includes a physical carrier index. Set to 0 if paged AMSs can perform network entry via a current carrier. That is, set to 1 when the paged AMS cannot perform network entry via a current carrier. 1: including the physical carrier index |
| } | | |

Method 5

Method 5 is a method of informing the AMS of a carrier for network entry via a location update procedure.

If the paged carrier is a fully configured carrier, but network reentry is impossible via the carrier (for example, cell bar=1), the AMS requests a physical carrier index for network entry from the ABS via a location update message (AAI_RNG-REQ).

In this case, the AMS may include preferred carrier index information for network reentry in an AAI-RNG-REQ message and transmit the message to the ABS.

The ABS which receives the AAI_RNG-REQ message for requesting the physical carrier index from the AMS includes the physical carrier index for enabling the AMS to perform network entry in a ranging response (AAI_RNG-RSP) message and transmits the message to the AMS.

In this case, if the preferred carrier index information is included in the ranging request message (AAI-RNG-REQ), the physical carrier index transmitted from the ABS to the AMS may be set to the preferred carrier index requested by the AMS.

The AMS which receives the ranging response (AAI_RNG-RSP) message from the ABS performs network entry using the physical carrier index included in the ranging response message.

If the preferred carrier information is included in the AAI-RNG-REQ message and the physical carrier index is not included in the AAI-RNG-RSP message, the AMS performs network reentry using the carrier corresponding to the preferred carrier index included in the ranging request message.

Table 15 shows an example of the format of a ranging request message including preferred carrier index information.

TABLE 15

| Attributes/Array of attributes | Size (bits) | Value/Note | Conditions |
|---|---|---|---|
| Ranging purpose indication | 8 | 0b0000 = Initial network entry. . . . 0b1110 (or 0b01111) = Location update procedure to request the physical carrier index where the AMS performs the network entry. | |
| For (j=0; j<Num_CarrierIndexes; j++) { | | Num CarrierIndexes indicates the number of carriers for enabling the AMS to perform network entry. | |
| Preferred carrier index | 6 | Preferred carrier index for enabling the AMS to perform network reentry | |

Table 16 shows an example of the format of a ranging response (REG-RSP) message including carrier index information for network entry.

TABLE 16

| Attributes/Array of attributes | Size (bits) | Value/Note | Conditions |
|---|---|---|---|
| Physical carrier index | 8 | Indicates the physical carrier index where the AMS performs the network entry. | |

Hereinafter, a method of setting a paging carrier of an AMS between the AMS and an ABS (or a paging controller) by, at the AMS, reporting an E-MBS service reception status to the ABS via a location update procedure based on Embodiments 1 to 3 will be described with reference to FIGS. 9 to 12.

Figure 9:
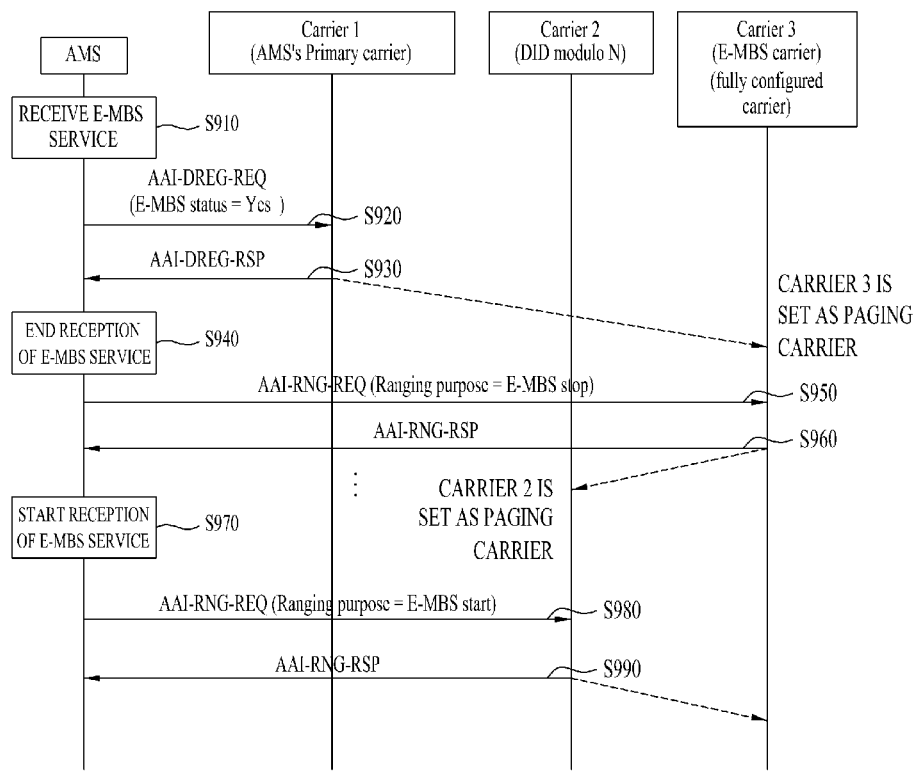
FIGS. 9 to 12 are flowcharts illustrating a process of setting a paging carrier of an E-MBS terminal according to the embodiments of the present invention.
Figure 10:
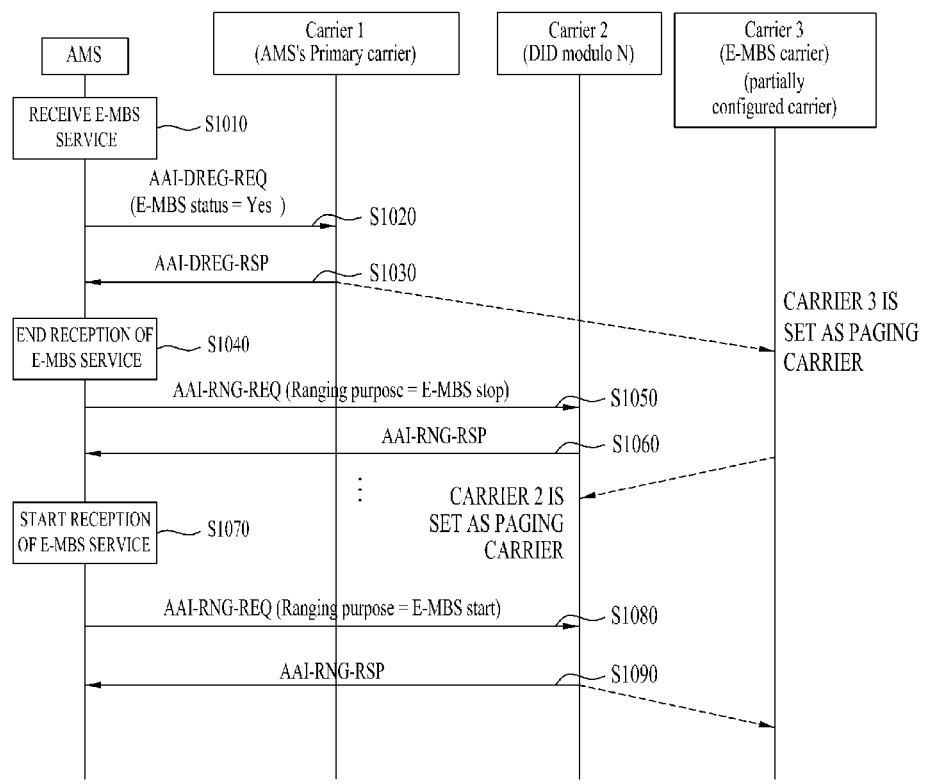
Figure 11:
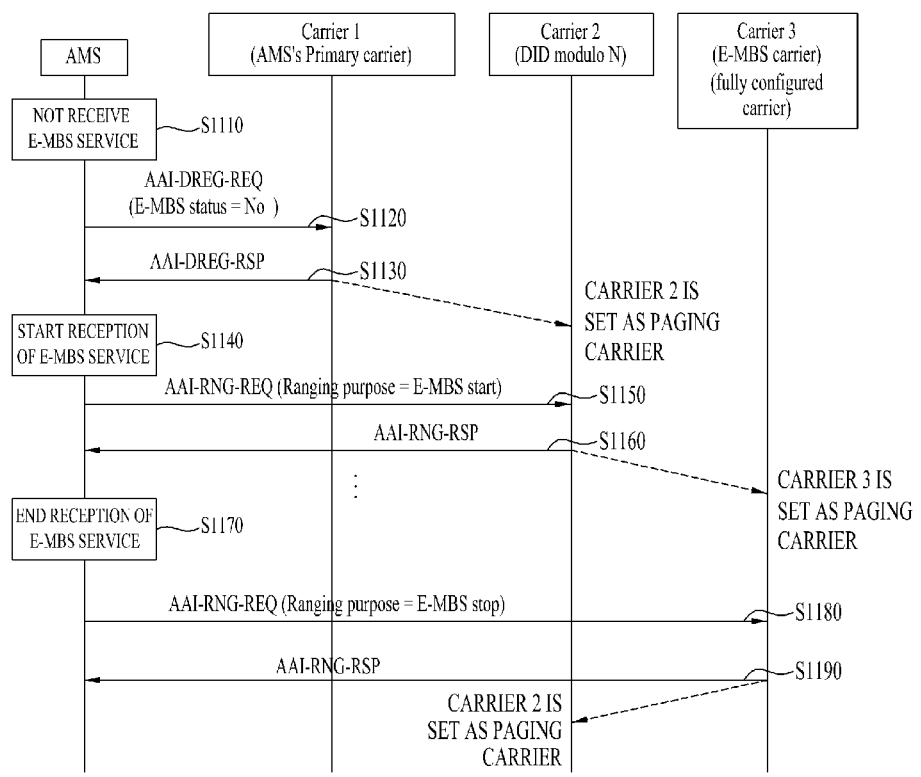
Figure 12:
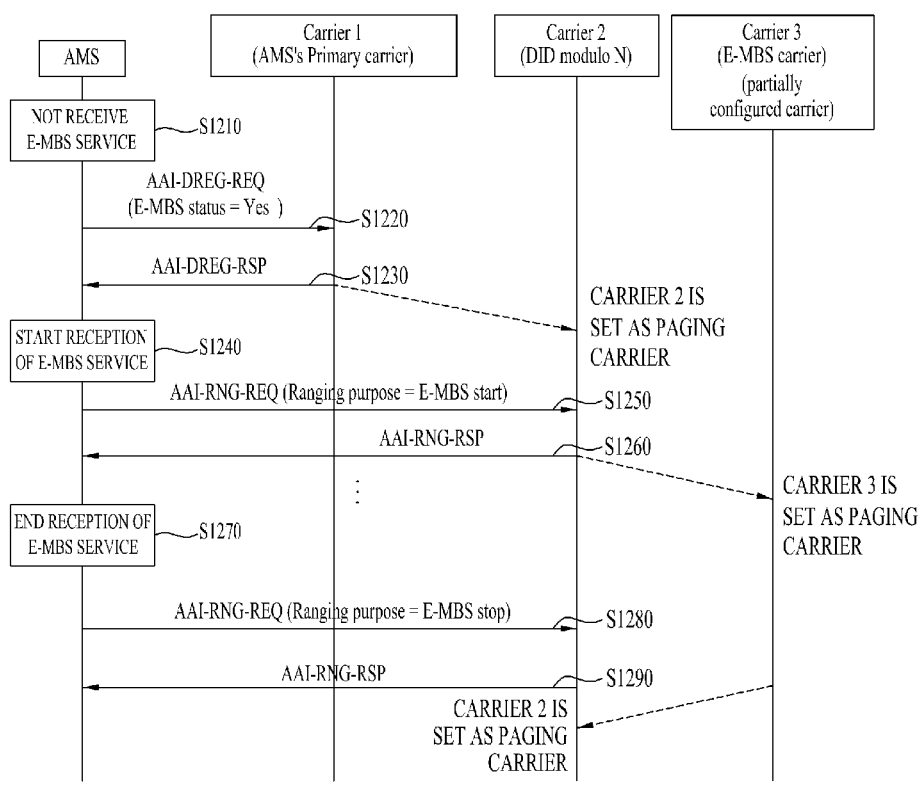

FIGS. 9 and 10 show a paging carrier setting method when an AMS transitions to an idle mode while receiving an E-MBS service and FIGS. 11 and 12 show a paging carrier setting method depending on whether an E-MBS service is received, after the AMS transitions to an idle mode without receiving an E-MBS service.

In FIGS. 9 to 12, the AMS may inform the ABS of the E-MBS service reception status of the AMS when the AMS transitions from a connected mode to an idle mode, that is, via a deregistration process with the ABS.

First, FIG. 9 shows a method of setting a paging carrier by reporting E-MBS service reception status information via a location update procedure according to an embodiment of the present invention.

FIG. 9 shows a method of setting a paging carrier when a carrier for transmitting an E-MBS service is a fully configured carrier.

Referring to FIG. 9, if an AMS receives an E-MBS service when transitioning from a connected mode to an idle mode (S190), the AMS informs an ABS that the E-MBS service is received via a deregistration request (AAI_DREG-REQ) message (S920).

Since the AMS receives the E-MBS service, the paging carrier of the AMS is set to an E-MBS carrier (that is, carrier 3). At this time, the ABS may include information indicating that the paging carrier is carrier 3 in the deregistration response (AAI-DREG-RSP) message and transmit the message to the AMS (S930).

As shown in FIG. 9, carrier 3 which is the E-MBS carrier is a fully configured carrier. Accordingly, when the AMS ends reception of the E-MBS service (S940), the AMS transmits a ranging request (AAI-RNG-REQ) message to the ABS via the E-MBS carrier and informs the ABS that reception of the E-MBS service ends (S950).

Since reception of the E-MBS service ends, the paging carrier of the AMS is set to a carrier (carrier 2) corresponding to DID modulo N.

At this time, the ABS may include information indicating that the paging carrier is carrier 2 in an AAI-RNG-RSP message and transmit the message to the AMS (S960).

If the AMS starts to receive the E-MBS service again via carrier 2 (S970), the AMS transmits an AAI-RNG-REQ message indicating that the E-MBS service starts to be received via carrier 2 to the ABS in order to inform the ABS that the E-MBS is received (S980).

The paging carrier is set to "carrier 3" as described above. At this time, the ABS may include information indicating that the paging carrier is carrier 3 in the AAI-RNG-RSP message and transmit the message to the AMS (S990).

FIG. 10 shows a method of setting a paging carrier according to another embodiment of the present invention, particularly, when an E-MBS carrier is a partially configured carrier.

Steps S1010 to S1040 and S1070 to 1090 are equal to steps S910 to S940 and S970 to S990 of FIG. 9 and a description thereof will be omitted and only a difference therefrom will be described.

Referring to FIG. 10, since the E-MBS carrier (carrier 3) is a partially configured carrier, when the AMS stops reception of the E-MBS service, the AMS transmits the AAI-RNG-REQ message to the ABS via carrier 2 (carrier corresponding to DID modulo N) and informs the ABS that reception of the E-MBS service ends (S1050).

Here, the paging carrier is set to carrier 2 (carrier corresponding to DID modulo N). At this time, the ABS may include information indicating that the paging carrier is carrier 2 in the AAI-RNG-RSP message and transmit the message to the AMS (S1060).

FIG. 11 is a diagram showing a method of setting a paging carrier by reporting, at an idle-mode AMS, E-MBS service reception status information via a location update procedure according to another embodiment of the present invention.

FIG. 11 shows a method of setting a paging carrier if a carrier where an E-MBS service is transmitted is a fully configured carrier.

Referring to FIG. 11, when the AMS transitions from a connected state to an idle mode, the AMS transmits an AAI-DREG-REQ message including information indicating that an E-MBS service is not received to the ABS and reports an E-MBS service reception status (S1110 and S1120).

Since the idle-mode AMS does not receive the E-MBS service, the paging carrier of the idle-mode AMS is set to carrier 2 (that is, carrier corresponding to DID modulo N). At this time, the ABS may include information indicating that the paging carrier is carrier 2 in the AAI-DREG-RSP message and transmit the message to the AMS (S1130).

As shown in FIG. 11, the E-MBS carrier is a fully configured carrier.

Thereafter, if the AMS starts to receive the E-MBS service (S1140), the AMS transmits the AAI-RNG-REQ message to the ABS via carrier 2 (carrier corresponding to DID modulo N) and informs the ABS that the E-MBS service starts to be received (S1150). In this case, the paging carrier is set to carrier 3 (E-MBS carrier). At this time, the ABS may include information indicating that the paging carrier is carrier 3 in the AAI-RNG-RSP message and transmit the message to the AMS (S1160).

Thereafter, if the AMS ends reception of the E-MBS service (S1170), the AMS transmits the AAI-RNG-REQ message to the ABS via carrier 3 in order to inform that reception of the E-MBS service ends (S1180). In this case, the carrier 2 is set as the paging carrier. At this time, the ABS may include information indicating that the paging carrier is carrier 2 in the AAI-RNG-RSP message and transmit the message to the AMS.

FIG. 12 shows a method of setting a paging carrier according to another embodiment of the present invention, particularly, when an E-MBS carrier is a partially configured carrier.

Steps S1210 to S1270 are equal to steps S1110 to S1170 of FIG. 11 and a description thereof will be omitted and only a difference therefrom will be described.

As shown in FIG. 12, the E-MBS carrier is a partially configured carrier.

When the AMS starts to receive the E-MBS service, the AMS transmits the AAI-RNG-REQ message to the ABS via carrier 2 (carrier corresponding to DID modulo N) and informs the ABS that the E-MBS service is received (S1250). Here, the paging carrier is set to carrier 3 (E-MBS carrier). At this time, the ABS may include information indicating that the paging carrier is carrier 3 in the AAI-RNG-RSP message and transmit the message to the AMS (S1260).

Thereafter, when the AMS stops the E-MBS service received via carrier 3 (S1270), the AMS transmits the AAI-RNG-REQ message including information indicating that reception of the E-MBS service ends to the ABS via carrier 2 (carrier corresponding to DID modulo N) in order to inform the ABS that reception of the E-MBS service ends.

In this case, carrier 2 is set to the paging carrier. At this time, the ABS may include information indicating that the paging carrier is carrier 2 in the AAI-RNG-RSP message and transmit the message to the AMS (S1290).

The invention claimed is:

1. A method of receiving a paging message of a mobile station (MS) in a multicarrier system, the method comprising:
    transmitting, by the MS to a base station (BS), a deregistration request message including information indicating whether the MS currently receives an enhanced multicast and broadcast service (E-MBS) when the MS transitions to an idle mode;
    setting a paging carrier to a first carrier where the E-MBS is provided if the information indicates that the MS currently receives the E-MBS;
    setting a paging carrier to a second carrier corresponding to a deregistration identifier (DID) modulo N if the information indicates that the MS does not currently receive the E-MBS,
    wherein N is a number of carriers in a paging; and
    receiving a paging message from the BS via the first carrier or the second carrier according to the set paging carrier,
    wherein the information indicating whether the MS currently receives the E-MBS includes information for reception of the E-MBS starts or ends, of which the BS is informed, and
    wherein if the paging carrier is set to the first carrier, when network reentry fails to perform in a predetermined time after the paging message is received from the first carrier, the paging message is re-received from the BS via the second carrier.

2. The method according to claim 1, further comprising:
    receiving, from the BS, a deregistration response message in response to the deregistration request message, when the deregistration request message including E-MBS reception status information and paging carrier selection mode information is transmitted to the BS.

3. The method according to claim 1, wherein the first carrier is a fully configured carrier or a partially configured carrier and the second carrier is a fully configured carrier.

4. A mobile station (MS) for receiving a paging message in a multicarrier system, the MS comprising:
    a radio frequency unit configured to transmit and receive a radio signal to and from an external device; and
    a controller connected to the radio frequency unit,
    wherein the controller controls the radio frequency unit to:
        transmit, to a base station (BS), a deregistration request message including information indicating whether the MS currently receives an enhanced multicast and broadcast service (E-MBS) when the MS transitions to an idle mode,
        set a paging carrier to a first carrier where the E-MBS is provided if the information indicates that the MS currently receives the E-MBS,
        set a paging carrier to a second carrier corresponding to a deregistration identifier (DID) modulo N if the information indicates that MS does not currently receive the E-MBS,
        wherein N is a number of carriers in a paging, and
        receive a paging message from the BS via the first carrier or the second carrier according to the set paging carrier,
    wherein the information indicating whether the MS currently receives the E-MBS includes information for reception of the E-MBS starts or ends, of which the BS is informed, and
    wherein if the paging carrier is set to the first carrier, when network reentry fails to perform in a predetermined time after the paging message is received from the first carrier, the paging message is re-received from the BS via the second carrier.

5. The MS according to claim 4, wherein the controller controls the radio frequency unit to receive a deregistration response message from the BS in response to the deregistration request message, when the deregistration request message including E-MBS reception status information and paging carrier selection mode information is transmitted to the BS.

6. The MS according to claim 4, wherein the first carrier is a fully configured carrier or a partially configured carrier and the second carrier is a fully configured carrier.

* * * * *